April 26, 1932.     F. E. PAYNE     1,855,558
BALL AND SOCKET JOINT
Filed Dec. 9, 1929
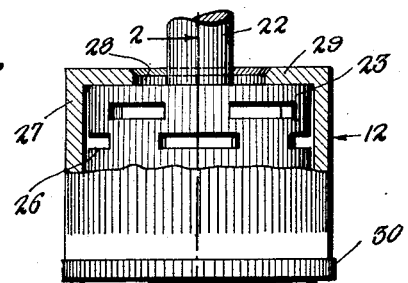
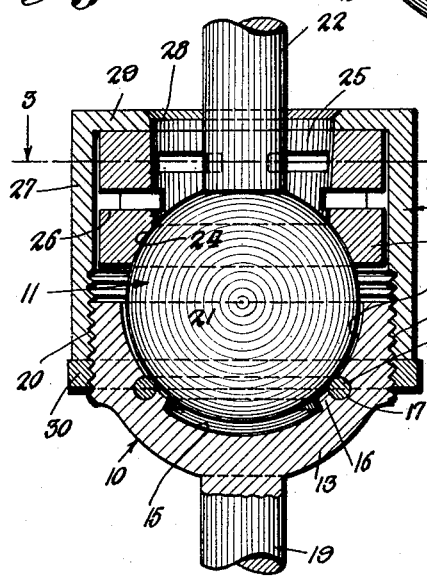
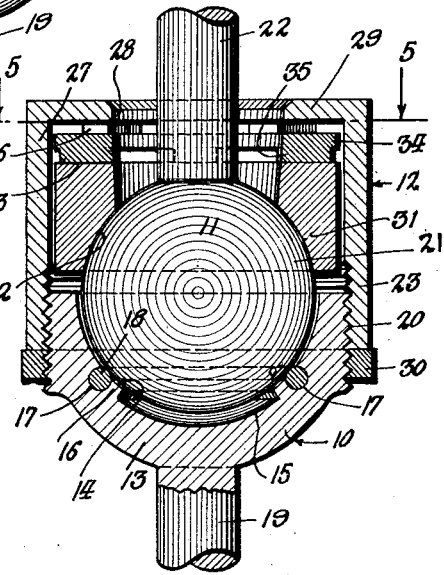
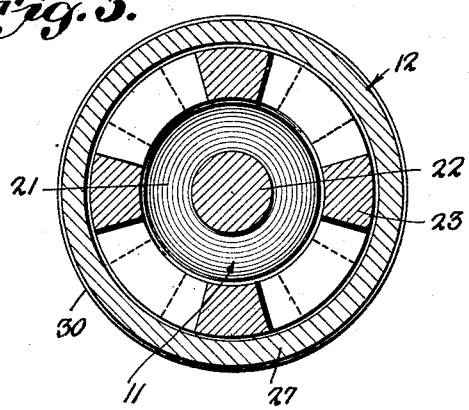
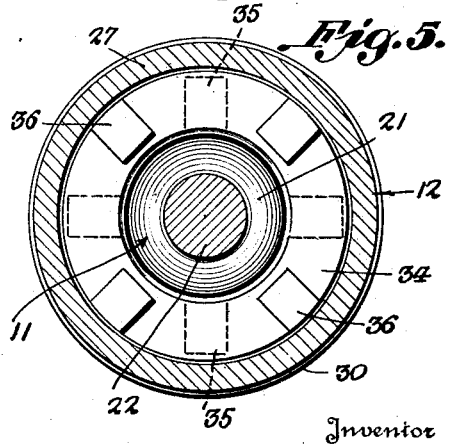
Inventor
F. E. Payne Patented Apr. 26, 1932

1,855,558

UNITED STATES PATENT OFFICE

FRANK E. PAYNE, OF ABERDEEN, SOUTH DAKOTA

BALL AND SOCKET JOINT

Application filed December 9, 1929. Serial No. 412,759.

This invention relates to new and useful improvements in joints, and particularly to ball and socket joints.

One object of the invention is to provide a joint of this character which will resist movement to the desired degree.

Another object is to provide a joint of this character which requires no oil, and which is resilient to furnish firm frictional engagement of the parts.

Another object is to provide a joint of this character which can be easily and quickly taken apart and put together.

Other objects and advantages will be apparent from the following description when taken in connection with the accompanying drawings.

In the drawings:

Figure 1 is an elevation of a ball and socket joint, partly broken away, and made in accordance with the present invention.

Figure 2 is a sectional view on the line 2—2 of Figure 1.

Figure 3 is a horizontal sectional view on the line 3—3 of Figure 2.

Figure 4 is a sectional view similar to Figure 2, showing a modified form of compression ring.

Figure 5 is a horizontal sectional view on the line 5—5 of Figure 4.

Referring particularly to the accompanying drawings, the joint comprises three parts, indicated by the numerals 10, 11, and 12, the first of which is the socket member, the second of which is the ball member, and the last of which represents the retaining ring.

The socket member includes the body 13, which has the socket or chamber 14 therein, and which opens through one end of the body. The inner end wall of the socket or chamber is concave, as shown at 15, and formed on the concave face of said socket is the circular rib 16, having the longitudinally extending groove 17, which contains a strip of suitable lubricant impregnated packing 18. The closed end of the body 13 is provided with a stem 19 which may be adapted, in any suitable manner, for attachment to a part, not shown. The open end of the body is externally threaded, as shown at 20.

The member 11, of the joint, comprises a spherical body 21, which is disposed within the socket or chamber 14, so that its external face wipes against the packing, as said spherical body rotates, whereby to apply lubricant thereto. The spherical body 21 is provided with a stem 22, similar to the stem 19, and for attachment to another part, not shown.

Engaged on the stem 22 is a compression member 23, which has the curved inner face 24 bearing on, and conforming with the external face of the ball member 21. The central opening 25, through the member 23, is of such diameter as will permit the stem 22 free movement. Formed circumferentially in the member 23 are the rows of staggered slots 26, which permit yielding compression of the ring, upon pressure being exerted inwardly on said ring, by the member 12. The member 12 comprises a cylindrical body 27, internally threaded at one end for engagement on the threaded exterior of the socket member 10. The other end of the member 12 is formed with a central opening 28, receiving the stem 22 therethrough, which results in the flange 29, and which flange bears against the outer end face of the compression member 23, whereby to force the member against the face of the ball 21, and cause the compression of said member. A nut 30 is screwed on the socket member, for engagement with the adjacent end face of the member 12, for the purpose of locking the member 12 against rotation, on the socket member, in either direction.

In the modification shown in Figures 4 and 5, it will be noted that the compression ring is formed in two parts, each without the slots of the other form, but having the same properties as the slotted compression ring of said first form. This modification comprises the ball contacting portion 31 having the concave face 32 fitting against the face of the ball, while its other end face is plain, as shown at 33. The other portion is in the form of a ring 34 having the lugs 35 on its lower face which contact with the face 33, of the portion 31, while the upper or outer face of the portion 34 has similar lugs 36 against which the flange 29, of the retaining ring 27 bears. It will be noted that the lugs 35 are staggered in relation to the lugs 36, so that the general effect is the same as the slotted ring of the other form.

What is claimed is:

A ball and socket joint comprising a socket member, a ball member seated within the socket member, a metallic compressible spring member having a socket receiving a portion of the ball member, said spring member being formed with circumferentially extending and staggered slots, and a casing engaging and pressing on said compressible member to hold the same frictionally against the ball member, said casing being threadedly engaged on said socket member.

In testimony whereof, I affix my signature.

FRANK E. PAYNE.